Sept. 14, 1954 R. C. McLEOD ET AL 2,688,844
ROTARY COMPRESSOR AND ITS CONTROL, AND APPLICATION
THEREOF IN COMBUSTION TURBINE POWER PLANT
Filed March 4, 1946 6 Sheets-Sheet 1

Patented Sept. 14, 1954

2,688,844

UNITED STATES PATENT OFFICE 2,688,844

ROTARY COMPRESSOR AND ITS CONTROL, AND APPLICATION THEREOF IN COMBUSTION TURBINE POWER PLANT

Roderick Cristall McLeod, Cropston, Leicester, and James Hodge, Narborough, Leicester, England, assignors to Power Jets (Research & Development) Limited, London, England Application March 4, 1946, Serial No. 651,862

Claims priority, application Great Britain March 5, 1945

8 Claims. (Cl. 60—35.6)

This invention relates to means for controlling the operation of rotary compressors for compressing elastic fluids, and of internal combustion turbine (or "gas turbine") power plants (e. g. for use as aircraft motors) which include one or more rotary compressors, this term being understood to mean dynamic type compressors with blades or vanes to the exclusion of positive-displacement compressors, examples of rotary compressors as herein understood being the well-known axial-flow and centrifugal types of compressor. The term is also to be understood as including multiple compressor systems in which two or more such rotary compressor elements, which may be of different types, e. g. centrifugal and axial-flow, are run in series on the same shaft. The invention includes compressors and gas turbine power plants embodying the improved control means.

The invention also includes a device for detecting and/or measuring the direction of flow of a stream of fluid relatively to a body immersed in it. Such a device, as will hereinafter be shown, may find an important use in the control of rotary compressors.

A general object of the invention is to provide for the automatic control of a rotary compressor or compressor system, or of a gas turbine power plant including a rotary compressor or compressors, by means responsive to conditions obtaining within the compressor or compressor system (i. e. between inlet and outlet thereof) and operative to control some one (or more than one) variable factor affecting the compressor operation directly, or affecting the operation of some other component of a complete power plant, thereby indirectly affecting the operation of the compressor system.

Another general object of the invention is to provide for automatic control of a rotary compressor so that its mass-flow and compression ratio are so related at all operating speeds, or for all values of a variable parameter (which may be the blade angles, for instance) at a given speed, as on the one hand to avoid surging (which occurs when the mass flow is too low) and on the other to ensure that an acceptable delivery pressure is maintained.

A further general object of the invention is to provide a control means or system for a gas turbine power plant including a rotary compressor, in which the turbine is coupled also to an external load. The accomplishment of this general object entails several important advantages, such as simplification of the fuel system, elimination of fuel supply governors, fuel control in accordance with altitude, and (indirect) control of working temperatures; and the attainment of these advantages are secondary objects of the invention.

Another object of the invention is to control a variable-area propulsion jet nozzle of a gas turbine motor, in accordance with conditions obtaining in the compressor and thereby to control the compressor operating line at the same time.

A further object of the invention relates to difficulty arising in multi-stage axial compressors. When the given set of conditions for which the blade angles are designed are departed from, the angles of some stages (for example the first stage) may be substantially correct, but the angles of other stages (for example the last) will be wrong and may be so excessively wrong as to result in stalling. The object here is to overcome this difficulty at least partially and to maintain such operative conditions that a compromise is attained in which, though the stages are not all operating ideally, none is operating beyond critical limits. Similarly when axial and centrifugal compressors are run in series on the same shaft, an object of the invention is to control both compressors simultaneously so that the operating line for the compressor assembly as a whole lies within the useful ranges of their respective characteristics, which differ strongly, thus providing a satisfactory compromise between the ideal requirements of the two classes of compressor.

The ideal aimed at, in all installations in which a variable speed rotary compressor is included, is to provide a control system in which the only variable under the direct control of the operator is the rotational speed, every other variable being automatically controlled to ensure that the operating conditions of the compressor and the whole installation approximate to the optimum for the selected speed.

Other objects and advantages of this invention will be apparent upon consideration of the following detailed description of several embodiments thereof in conjunction with the annexed drawings wherein.

Figure 1:
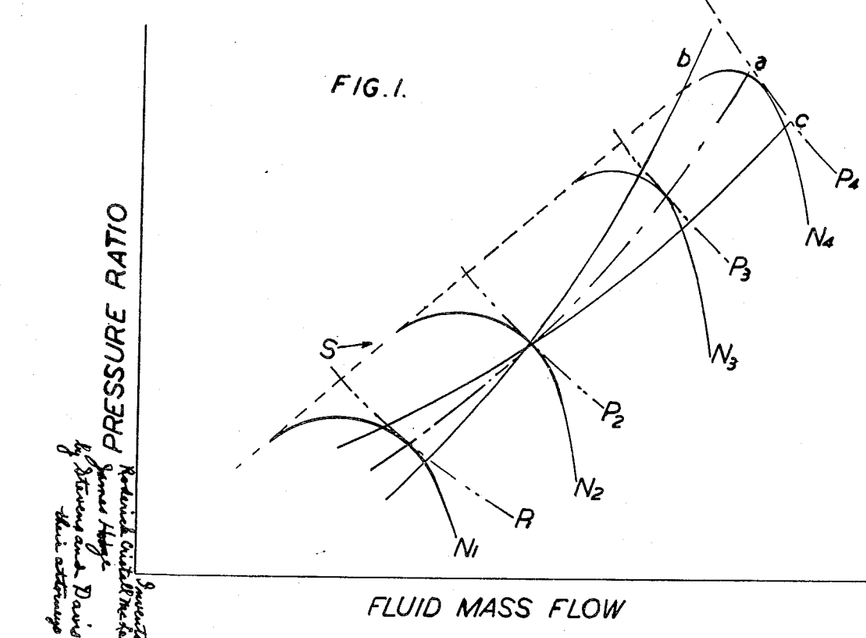
Figure 1 is a graphical illustration of the characteristics of a hypothetical compressor in terms of compression ratios plotted against mass flow for different corrected speeds.

The characteristics of a rotary compressor are shown graphically expressed in Figure 1 of the accompanying drawings. Figure 1 is a hypothetical diagram in which compression ratio is plotted against mass flow. With a given compressor any possible combination of these two quantities is represented by a point on the diagram called the "operating point." Assuming that the compressor has fixed geometrical characteristics such as blade angles, it can be shown that the operating points lie on curves (called "characteristics") such as $N_1$, $N_2$, $N_3$, $N_4$, each corresponding to a particular corrected speed, this being the true (rotational) speed divided by the square root of the ratio of the true absolute temperature of the fluid at inlet to a standard absolute temperature (such as 288° K. corresponding to 15° C.). In other words, at any given corrected speed the compression ratio and mass flow are uniquely related. The characteristics of any rotary compressor are of the general form shown in the diagram and it will be seen that at any given speed, increase of mass flow beyond a certain point entails a sharp decrease of compression ratio; conversely, with continued decrease of mass flow the compression ratio begins to decrease again. If the mass flow is reduced beyond a certain point, surging will occur; the latter points are defined by a line, S, called the "surge line," and operation of the compressor at points in the region to the left of this line will be characterized by surging. The object broadly stated in the preceding paragraph, in the case of variable speed compressor with fixed geometrical characteristics, is to control the compressor so that its operating points lie within a favorable region of the appropriate characteristic diagram. Generally there will only be one operating point at each corrected speed and these points will lie on a line such as $a$, $b$, or $c$ in Figure 1; these are called "operating lines," and it is clearly desirable to operate the compressor along a line such as $a$ giving a good compromise between mass flow and compresson ratio at every corrected speed within the working range of the compressor.

In the case of a fixed speed compressor, the characteristic diagram will resemble Figure 1, but each of the characteristics $N_1$, $N_2$, etc., will be associated with a particular value of some geometrical variable parameter of the compressor, such as blade angles, and a particular value of inlet temperature, at a constant true speed. As before, the object will be to control the operation of the compressor so that its operating line will be a favorable one corresponding generally to line $a$ of Figure 1.

As represented in Figure 1, the line $a$ may be considered an ideal operating line as it passes through the points at which the characteristics $N_1$, $N_2$, etc., are tangent to "constant corrected output" lines, $P_1$, $P_2$, $P_3$, etc., defined by different values of the product $$M\left(r\frac{V-1}{V}-1\right)$$

which is proportional to the work done per second by the compressor, corrected by the factor $$\frac{\tau_0}{\tau}$$

$\tau_0$ being the standard absolute temperature, $\tau$ the true absolute inlet temperature, $M$ the mass flow, $r$ the compression ratio and $V$ the ratio of specific heats. Clearly, operation along the line $a$ will give the highest output (work done per sec.) for every operating speed (or, in the case of a fixed speed compressor, every value of the geometrical variable parameter, such as blade angle).

The operating point is uniquely related to the ratio of true rotational speed to absolute fluid velocity, at a selected point of the compressor (or of corrected speed to corrected fluid velocity, since both rotational speed and fluid velocity are subject to the same correction for temperature). The manner in which the ratio varies with corrected speed, (or in the case of a fixed speed compressor, with an appropriate geometrical variable parameter of the compressor), determines the operating line of the compressor. The nature of this operating line will not only vary with the type of functional relationship between rotational speed, N, and air (or gas) velocity V, but also with the point in the compressor at which the air velocity is taken, and an appropriate choice of functional relationship $$\left(\frac{N}{V}=f(N)\right)$$

or/and position at which V is measured will give an operating line of the desired type. Furthermore, it is established by observation that in the case of an axial flow compressor the operating line defined by the relationship $$\left(\frac{N}{V}=\text{const.}\right)$$

can be made to approximate to an ideal operating line by appropriately selecting the constant value and the point at which V is measured. If this point is at the entry of the compressor, the operating line is typified by line $b$ in Figure 1 and has a steeper slope than the ideal line $a$, while if the point at which V is taken is at the delivery end the operating line is typified by line $c$ of Figure 1 and has a flatter slope than line $a$. An operating line of the type of $a$ is approximated to if $$\frac{N}{V}$$

has a suitable constant value when V is measured at a point midway between the entry and delivery ends of the compressor.

Similar considerations apply to fixed speed axial flow compressors, mutatis mutandis. With centrifugal compressors, the air speed, V, must be measured at the entry or "eye" and the operating line corresponding to constant $$\frac{N}{V}$$

will be somewhat steeper in slope than the ideal, but the ideal line can be reproduced approximately at least by selecting a suitable variable function, $$\frac{N}{V} = f(N)$$

In its practical application the invention contemplates the use in the system of governor means sensitive to the ratio of the rotational speed of the compressor to the air or gas velocity at a selected point of the compressor, and optionally to the rotational speed itself or/and some other parameter of the operating conditions and operative to control some one or more factors or parameters affecting the operation of the compressor, in such a way that the said ratio is maintained at a prescribed value, which may be constant or related in a prescribed way to the rotational speed or some other variable parameter.

The governor means, may include separate devices or elements respectively sensitive to the rotational speed and to the air velocity and means for combining the responses received from the two sensitive devices or elements, to produce a resultant response indicative of a departure of the ratio of the two monitored quantities (rotational speed and air velocity) from a prescribed value and the sign of such departure. It is not necessary that the response combining device should produce a resultant response indicative of the actual ratio, since it operates essentially on a null method; thus a resultant response indicative of the difference of the two received response strengths (and the sign of this difference) will achieve the desired result, provided the two response strengths are equal when the monitored quantities bear the prescribed ratio.

Alternatively, the governor may incorporate a single device or element which detects and/or measures changes in the ratio of rotational speed to air velocity directly. In this connection, use is made of the fact that at any given point within an axial flow compressor downstream of a row of rotor blading the whirl velocity (herein denominated $V_w$) is approximately proportional to the rotational speed N. Thus any departure from the prescribed value of the ratio of rotational speed to true air velocity ($V_w$) to axial velocity ($V_a$), i. e. in a change in the direction of flow relative to the stationary or rotative blading. Such changes of flow direction can be detected by any suitable forms of yawmeter, such as the conventional arrangement comprising two pressure tubes, connected for example to a capsule device, and having their open ends close together and set obliquely at equal opposed inclinations (usually 45°) to the mean direction of flow.

Figure 2:
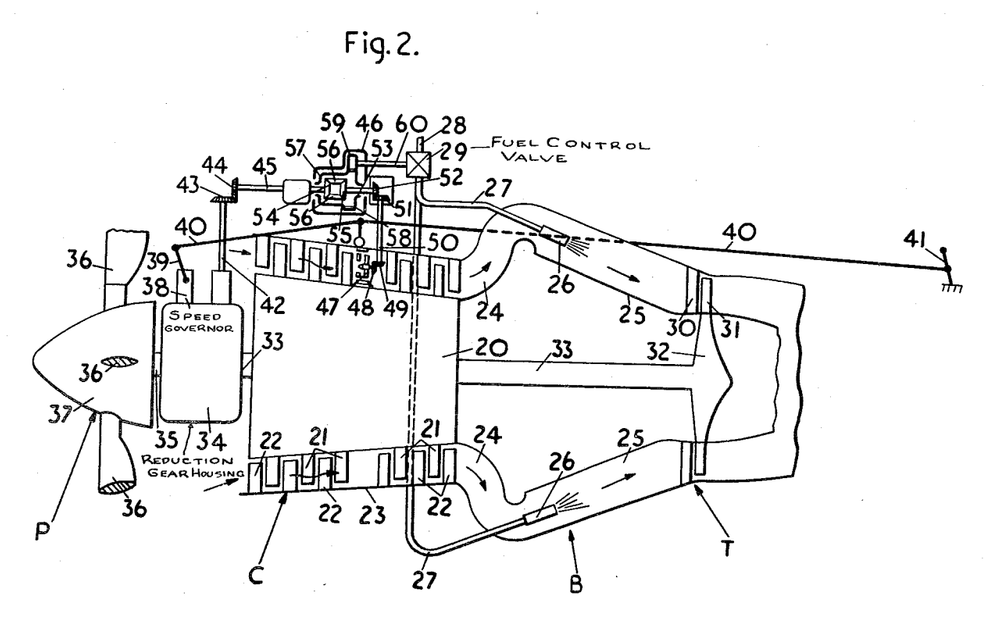
Figure 2 is a somewhat diagrammatic view in axial section of a gas turbine power plant driving a variable pitch propeller.

Referring now to the various illustrations of constructional embodiments in the accompanying drawings, the power plant of Fig. 2 comprises an axial-flow compressor C, combustion means B, a turbine T, and a variable pitch screw-propeller P. The compressor C comprises a rotor 20 carrying rotor blades 21, and a stator casing 23 carrying stator blading 22. The compressor delivers air through ducting 24 to the combustion means B, comprising combustion chambers 25 and fuel burners 26 fed by pipes 27 from a fuel main 28 through a fuel control valve diagrammatically indicated at 29. This valve may be of conventional construction well known to those skilled in the art and its details are therefore not illustrated. It is operated by shaft 60 hereinafter described. The turbine T, comprises a stationary nozzle ring or system of vanes 30 and moving blading 31 mounted on a turbine rotor disc 32. It exhausts through a propulsive jet nozzle (not shown). The direction of flow of the air and products of combustion is indicated by arrows.

The turbine and compressor rotors 32, 20 are carried on a common shaft 33, supported in suitable bearings (not shown) and this shaft is extended from the front or entry end of the compressor into a housing 34 containing reduction gearing of conventional type and therefore not illustrated for driving a propeller shaft 35 coaxial with shaft 33, at reduced speed. The propeller P, comprising blades 36 and a spinner 37 is mounted on shaft 35 and the propeller blades are mounted in their hub (not shown) for pitch variation. The pitch-varying mechanism which, being of conventional type, is not illustrated, is controlled by a conventional speed governor or "constant speed unit" of well known construction shown diagrammatically at 38, being mounted on the reduction gear housing 34 and driven by an auxiliary drive arranged therein. The speed governor 38 has a speed selector lever 39 connected by rodding 40 with a manual speed control lever 41.

The reduction gear housing 34 also contains auxiliary gearing (not shown) through which shaft 33 drives an offtake shaft 42 which drives another shaft 45 through bevel gearing 43, 44.

About half-way along the compressor C, a gap is left between adjacent rows of blading in which is located an anemometer comprising a fixed pitch screw-type windmill 47 (see Fig. 3) driving a bevel gear 48 in mesh with another bevel gear 49 on a shaft 50 whch drives a further shaft 53 through bevel gears 51, 52, whose speed is a measure of the speed of the windmill 47 and hence of the air velocity at the region of the compressor in which the windmill is located.

Shaft 53 also enters the housing 46 at the opposite end to shaft 45. This housing contains bevel differential gearing comprising sun-wheels 54, 55 respectively fast on shafts 45, 53, and a planetary cage 57 carrying planet wheels 56 meshing with the two sun-wheels. The planetary cage is free and carries a spur gear ring 58 meshing with a pinion 59 fast on the shaft 60 already mentioned.

The gear ratios and "handedness" of the shafts 45 and 53 are so predetermined that simultaneous changes of compressor rotational speed and air velocity, of such magnitude that the ratio of these quantities is not altered, cause equal and opposite rotations of shafts 45 and 53, so that no rotation of the planetary cage 57 takes place. But changes of rotational speed or/and air velocity which alter ratio of these quantities rotate the shafts 45 and 53 at unequal (opposite) speeds, so that the planetary cage is rotated at a speed measuring the algebraic difference of the speeds of shafts 45 and 53 (opposite rotations of shafts 45, 53 being taken as having the same sign). Increase or decrease of the ratio of rotational speed to air velocity is therefore reflected in a rotation of the planetary cage 57 and hence of shaft 60 in one direction or the other.

The shaft 60 operates the fuel control valve 29 in the sense to increase the fuel supply when shaft 59 is angularly displaced in the direction corresponding to a decrease of the ratio of rotational speed to air velocity $$\left(\frac{N}{V}\right)$$

The increased fuel supply thus provided by increasing the back-pressure on the compressor throttles the compressor delivery and this has the effect of increasing the ratio, $$\frac{N}{V}$$

as is required to bring the compressor back on to its prescribed operating line. That this is so will be seen more easily by considering the case of operation at constant speed, and constant density and temperature. If for any cause the mass flow increases, the air velocity will also be increased and the ratio $$\frac{N}{V}$$

will be decreased; the consequent increase of fuel supply, by throttling the compressor, will reduce the mass flow and hence increase the ratio $$\frac{N}{V}$$

again. Evidently, a decrease of mass flow will likewise bring about a compensating action to increase the mass flow and restore the ratio $$\frac{N}{V}$$

to its prescribed value. The system is stable and operates in the required way whatever the cause of departure of the compressor from its prescribed operating line.

It will also be recognized that, after a disturbance, involving a lasting change of the "external" circumstances of the power plant, e. g. a change in altitude with its accompanying changes of air density and temperature, the system stabilises at the prescribed value of $$\frac{N}{V}$$

but with different values of the fuel supply and of the consequent liberation of energy.

Figure 3:
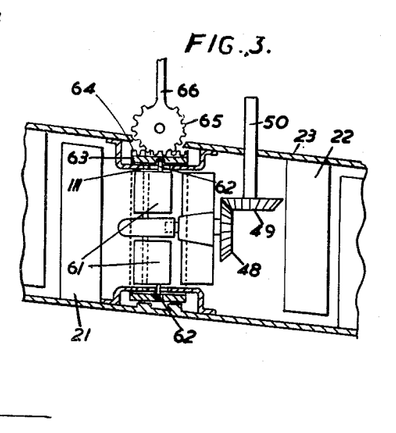
Figure 3 shows a detail of Figure 2 on an enlarged scale.

The system as so far described stabilises the compressor on an operating line for which $$\frac{N}{V}$$

is constant. This may not be entirely satisfactory. At higher (selected) rotational speeds the operating point (defined by the intersection of the operating line with the constant speed characteristic (see Fig. 1)) may not be within the capacity of the turbine or the operating line (defined by $$\frac{N}{V} = \text{constant})$$

may depart too much from the ideal. Provision is therefore made for varying the value of $$\frac{N}{V}$$

at which the system stabilises, by the inclusion of means for varying the datum of the combined rotational-speed-responsive and air-velocity-responsive mechanisms (see Fig. 3). This means comprises a row of variable angle stator blades 61 upstream of the anemometer windmill 47. Varying the angles of these stator blades has the same effect as varying the pitch angle of the blades of windmill 47, namely to alter the relation between the air velocity in the region of the windmill and the speed of the windmill and its driven shaft 53. This in turn alters the equilibrium value of $$\frac{N}{V}$$

at which the system stabilises.

The blades 61 being mounted for variation of their angle in any convenient way, have pins 62 eccentric from the axes 111 on which the blades turn for angle variation and these pins are engaged by a grooved ring 63 which can slide axially of the windmill and carries a rack 64 engaged by a pinion 65.

In the arrangement illustrated the pinion 65 is angularly displaceable responsively to changes in selected revolutions per minute of the shaft 33 by a lever 66 fast on the pinion 65 and connected to the rodding 40 connecting the manual speed control lever 41 with the speed selector lever 39 of the rotational speed-governor 38.

Figure 4:
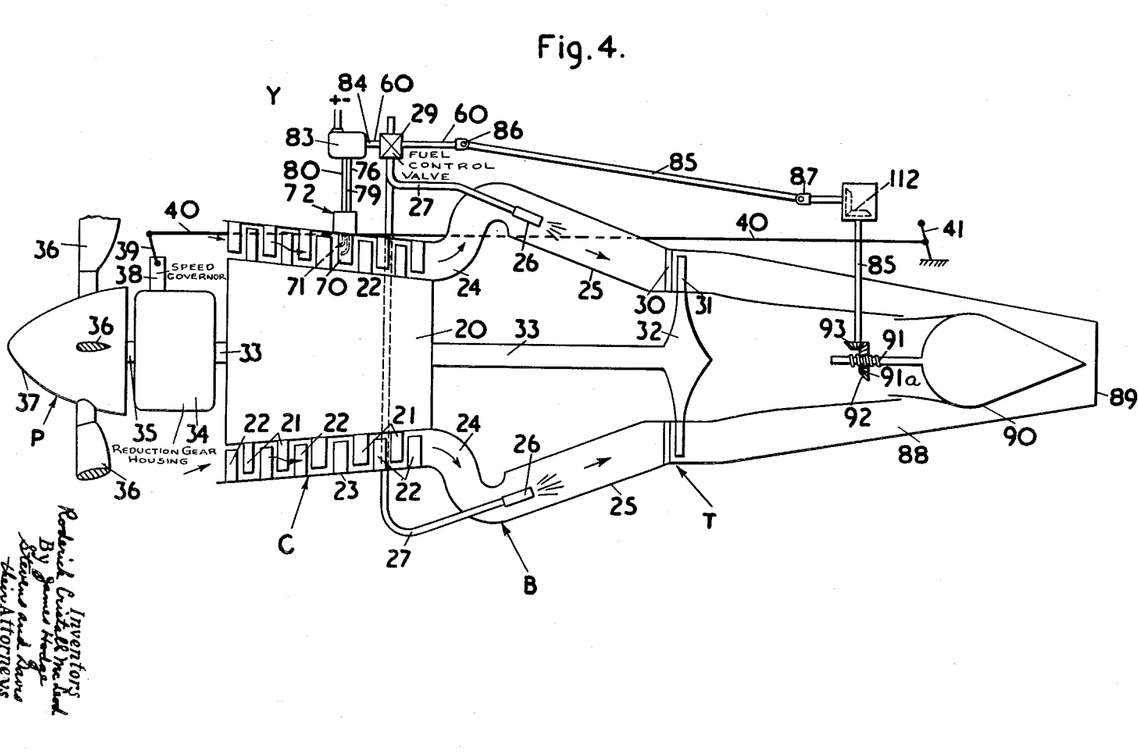
Figure 4 is a view similar to Figure 2 of a modified type of plant.

In the modified plant shown in Fig. 4, the compressor C, combustion means B, turbine T, and propeller P and their various parts, including the propeller governor and speed selector means, are counterparts of the corresponding items of Fig. 2 and have the same reference numbers. The control of the compressor operating line is, however, in this instance affected by a single element in the form of a "yawmeter" Y, consisting of a "yawmeter head" hereinafter described, placed midway along the compressor tunnel downstream of a row of rotor blades and registering deviations of the direction of air flow in that region by the difference of two pressures detected by the yawmeter head and transmitted by two tubes 70, 71 to an electrical receiver device 72 (see Fig. 9). The device 72 comprises a sealed chamber 73 with the interior of which tube 70 communicates and which contains a bellows-type capsule 74. Tube 71 communicates with the interior of the capsule through its fixed end and the free end of the capsule carries a moving contact bar 75, which is connected as shown with an input lead 76 and can make contact with one of two fixed contacts 77, 78 connected by leads 79, 80 respectively with "forward" and "reverse" field coils 81, 82 of a reversing motor 83 whose shaft 84 drives shaft 60 of the fuel valve 29 through reduction gearing (not shown).

Variation in either sense of the direction of air flow at the yawmeter head from the equilibrium direction, corresponding to a deviation of the ratio $$\frac{V_w}{V_a}$$

previously mentioned and therefore of the ratio $$\frac{N}{V}$$

Figures 5, 6, 7, 8, 9:
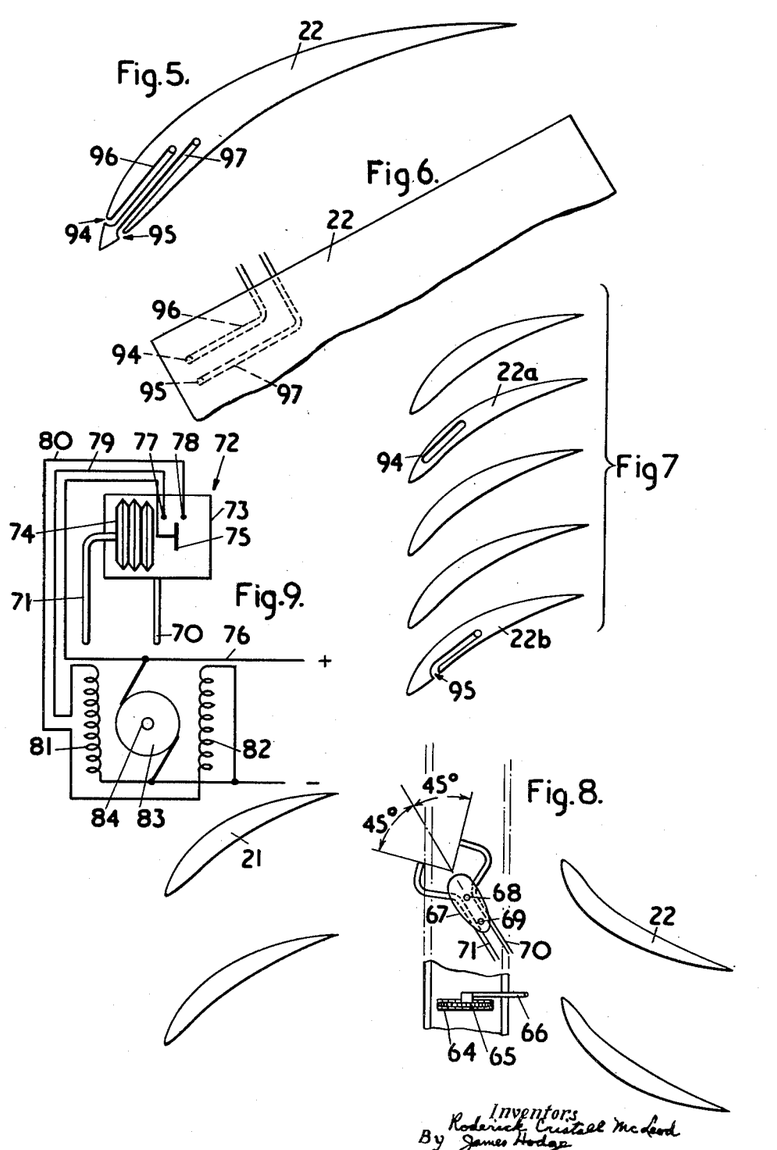
Figures 5 and 6 are partial views on an enlarged scale of a detail of Figure 4, taken mutually at right angles and showing a compressor-stator blade adapted to act as a "yawmeter head"
Figure 7 is an endwise view on an enlarged scale of part of a row of compressor-stator blades in Figure 4, showing a modified "yawmeter head" arrangement.
Figure 8 shows on an enlarged scale an alternative type of "yawmeter head" for use in the arrangement of Figure 4.
Figure 9 is a somewhat diagrammatic representation of the operating connections of the "yawmeter" of Figure 4.

(as previously explained) from their prescribed values will cause the moving contact 75 to make contact with one or other of the fixed contacts 77, 78, thus energizing one or other of the field coils of the motor 83 and causing it to rotate shafts 84 and 60 in the appropriate direction for opening or closing the fuel control valve 29 as required for restoring the compressor to its prescribed operating line, in which condition, the contact 75 is floating between the fixed contacts 77, 78 and the motor is "dead."

A further control is introduced in this case; the shaft 60 is prolonged through the housing of valve 29, and is continued by extension shafting 85 including universal joints 86, 87 and gearing 112 to operate a variable-area exhaust-jet-nozzle device.

The jet pipe 88 receiving the exhaust from turbine T terminates in a nozzle 89 whose effective cross-sectional area is variable by means of an axially slidable "bullet" 90 whose stem carries a worm 91 engaged by a nut 91a, located axially and having gearing 92 on its periphery engaged by a pinion 93 on the end of the shafting 85. The direction of rotation of shafts 60, 85 and the "hand" of nut 91a and worm 91 are such that the "bullet" 90 is shifted to restrict the nozle area when the fuel valve is opened.

The nozzle area may be relied on alone for controlling the compressor to keep it on the prescribed operating line, fuel supply being independently controlled, in which case the mechanism will decrease the nozzle area when $$\frac{N}{V}$$

increases and will increase the nozzle area when $$\frac{N}{V}$$

decreases, in order to restore the prescribed value of $$\frac{N}{V}$$

by its throttling action.

The "yawmeter head" used in this embodiment is of the novel type already mentioned and is shown in Figs. 5 and 6. One of the stator blades 22 of the compressor is provided with two orifices 94, 95 respectively on its upper and lower surfaces and near the leading edge. These orifices are connected by passages 96, 97 within the blade with the pressure tubes 70, 71 of Fig. 9. The locations of orifices 94, 95 are selected so that at the blade incidence corresponding to the prescribed value of $$\frac{N}{V}$$

the orifices experience equal pressures and so that small deviations of the blade incidence in one sense and the other produce marked differences of pressure of opposite sign at the orifices.

An alternative arrangement is illustrated in Fig. 7 in which the upper surface orifice 94 is formed in one blade 22a of the row of stator blades, and the lower surface orifice 95 is formed in another blade 22b of the same row. The blades being identical in shape and similarly situated with respect to the airstream, the pressures at corresponding points of every blade are the same.

Instead of the novel form of yawmeter head above described a conventional type may be used as shown in Fig. 8. In this arrangement the tubes 70, 71 are brought to a gap between adjacent rows of compressor blading 21, 22 and are bent so that their open ends are brought fairly close together and face one another and the air-stream obliquely, making equal angles (usually 45°) with the mean direction of the airstream, corresponding to the prescribed value of $$\frac{N}{V}$$

in this condition the pressures experienced by tubes 70, 71 are equal and the motor 83 is "dead." Deviation of the direction of flow at the open ends of the tubes causes a difference of pressure (whose sign corresponds to the sense of the deviation) to be transmitted by the tubes and the motor is energised in the appropriate sense, as before.

This type of yaw-meter head has advantages when "datum" varying means are embodied for varying the prescribed value of $$\frac{N}{V}$$

to which the compressor is to operate. In this case the mechanism for varying the blade angles of the anemometer stator blades, including the operative connection to the speed selector control, as illustrated in Figs. 2 and 3 and described with reference thereto, will be included in the embodiment shown in Fig. 4, but the movable stator blades wil be replaced by a single rotatable strut 67 pivotally supported at 68 and having an eccentric pin 69 (corresponding to pins 62 of Fig. 3) engaging the grooved sliding ring 63 the yawmeter head, which consists of the bent over ends of tubes 70, 71, being supported on the strut 67 and rotatable therewith to vary their angular disposition to the relative wind as shown in Fig. 8. The effect of varying this angular disposition is to alter the wind direction for which a zero response is received from the yawmeter head and this as already explained is equivalent to varying the value of $$\frac{N}{V}$$

at which zero response of the yawmeter is obtained and the system stabilises. To permit angular displacement of the yawmeter head, the tubes 70, 71 may include flexible sections near the yawmeter head.

The combined rotational-speed- and fluid-velocity-responsive means as described with reference to Figs. 2 to 9 may control the compressor operating line in other ways than by varying the fuel supply or jet nozzle area. Some of these are illustrated in Figs. 10 to 13.

Figure 10:
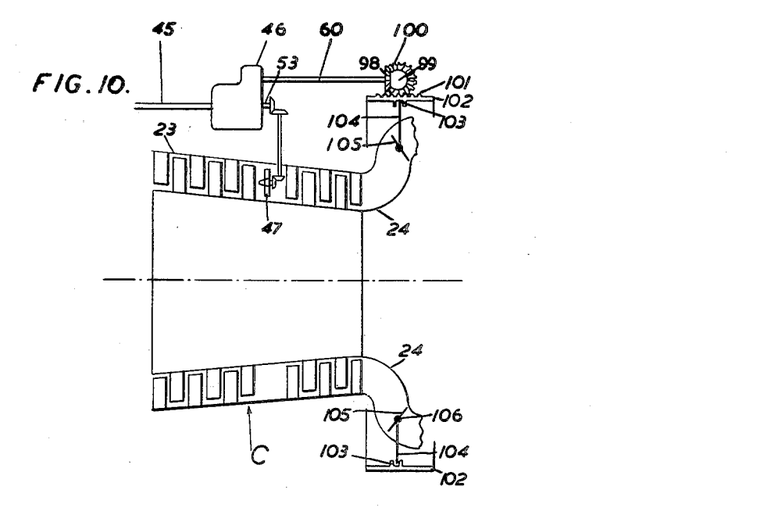
Figures 10, 11 and 12 are schematic representations of axial-flow compressors embodying modifications of the invention; and, Figure 13 is a schematic representation of a gas turbine power plant embodying a further modification of the invention.

In Fig. 10 which is a very schematic representation of an axial flow compressor similar to that of Fig. 2, having a shaft 45 running at a speed proportional to the compressor rotational speed, a shaft 53, driven by an anemometer 47 and a differential gear in a housing 46 driving a shaft 60 at a speed proportional to the algebraic difference of the speeds of shafts 45 and 53, all as in Fig. 2, the shaft 60 drives a bevel gear 98 meshing with another bevel gear 99 which also carries a spur gear ring 100 meshing with a rack 101 formed on a sleeve 102 which surrounds the outlet ducting 24 of the compressor C. Sleeve 102 has an internal annular groove 103 engaging the ends of levers 104 fast on throttle butterflies 105 pivoted at 106 in the ducting. Rotation of shaft 60 in response to differences of speed of shafts 45 and 53 indicating variations of the ratio $$\frac{N}{V}$$

thus shifts sleeve 102 axially and opens or closes the throttle butterflies 106 as required.

Figure 11:
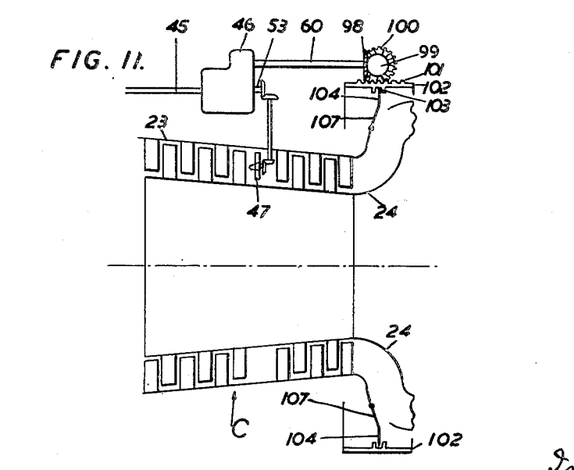

Fig. 11 only differs from Fig. 10 in that the levers 104, instead of operating throttle butterflies 105 in the compressor outlet ducting, operate gill flaps 107 operating as variable blow-off valves for the compressor delivery.

Figure 12:
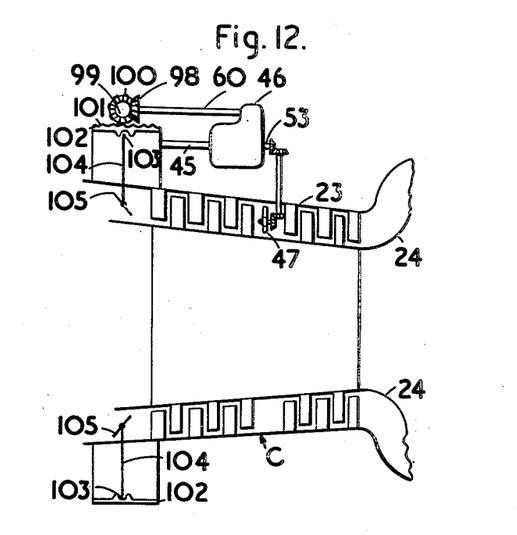

In Fig. 12 which shows a compressor similar to that of Fig. 10 in the same schematic way, the throttle butterflies 105 are placed in the inlet of the compressor, all the other parts being counterparts of the several parts shown in Fig. 10 and being indicated by corresponding reference numerals.

Figure 13:
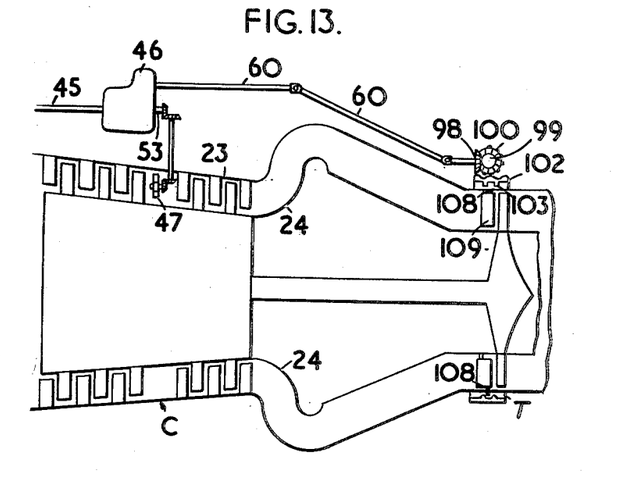

In Fig. 13, in which the compressor C forms part of gas-turbine power plant, the groove 103 of sleeve 102 engages pins 108 formed on the blades 109 of a row of variable angle blading, forming a variable nozzle ring for the turbine T. The blades are pivotally mounted to rotate about their radial axes and their pins 108 which project through slots of the casing are eccentric with respect to the pivotal axes 110 of the blades so that axial shifting of sleeve 102 causes the blade angles to vary simultaneously and equally, thus varying the turbine nozzle area and the angle of incidence of the turbine rotor blades.

In each of the embodiments schematically shown in Figs. 10 to 12 the directions of rotation of the various shafts and direction of motion of the rack and sleeve are so selected that decrease of $$\frac{N}{V}$$

brings about increased throttling of the compressor by closing the butterflies 105 or the gills 107 or by restricting the turbine nozzle area, increase of $$\frac{N}{V}$$

being reflected in a corresponding decrease of throttling.

It is to be understood that all the drawings hereto appended are somewhat diagrammatic and that the mechanism illustrated has been reduced to its most simple form consistent with being operative. In practice of course various refinements will be introduced, such as the incorporation of servo-motors providing the power required for operating the various controls. The introduction of such refinements does not however affect the mechanical and thermo-dynamic principles of operation of the installations as herein described with reference to the drawings; and the design and construction of such refinements and expedients as servo-motors and the like are within the knowledge of those skilled in the art.

The invention is not limited to what is shown in the accompanying drawings or particularly described with reference thereto, the drawings and description thereof being given by way of example only. Other embodiments and modifications, as will be within the competence of those skilled in the art, are included within the scope of the invention, which is defined in the appended claims.

We claim:

1. In an elastic fluid flow system which includes a rotary bladed impeller and a stator together constituting a compressor, means in said system to impose resistance to fluid flow, driving means connected to rotate said impeller at variable speed and thus inducing a flow of elastic fluid through said system by imparting energy to the fluid to overcome the resistance to flow and means for varying the resistance of said resistance imposing means, the provision of an operative connection between said varying means and said compressor comprising ratio-determining means in said compressor responsive to the ratio of the actual velocity of said fluid flow through said compressor at some chosen region in said compressor to the rotational speed of said bladed impeller and fluid together and actuating means connected to said ratio-determining means and to said varying means to actuate the latter under the control of the former to vary the resistance of said resistance imposing means in the sense of maintaining said ratio at a prescribed value.

2. In an elastic fluid flow system according to claim 1, wherein the compressor is an axial-flow compressor, the provision of ratio-determining means as therein set forth, which ratio-determining means comprise means in the fluid path in said chosen region responsive to the ratio of the whirl velocity component to the axial velocity component of the actual velocity of said fluid flow at said chosen region.

3. In an elastic fluid flow system according to claim 1, wherein the compressor is an axial-flow compressor, the provision of ratio-determining means as therein set forth, which said means comprise a yawmeter device having a pair of tubes each terminating in an orifice in said chosen region, which region is one where the actual velocity of the fluid is made up of an axial component and a whirl-velocity component, said orifices being directed to face towards two different components of the flow of the fluid, and means connected to said tubes and actuated differentially by the fluid in said tubes in response to the ratio of the said whirl-velocity component to the said axial component of the actual velocity of said fluid flow at said region.

4. A propulsion system for aircraft comprising a multi-stage axial-flow compressor, a bladed stator and a bladed rotor in said compressor, a gas-turbine in variable-speed driving relationship with said rotor, a combustion system connected to receive air from said compressor and to supply combustion products to said turbine as hot working fluid, means for supplying fuel to said combustion system and for varying the rate of supply, a jet pipe connected to receive exhaust gases from said turbine and discharge them rearwardly as a propulsive jet, an anemometer device located in a chosen position in the path of the stream of air through said compressor for rotation by said stream proportionally to the actual velocity of the stream at a region in the compressor, and a device driven by the turbine at a speed directly proportional to the rotational speed of said compressor rotor, said means for varying the rate of fuel supply being connected to and actuated by said two devices to vary the supply of fuel to said combustion system in a sense to maintain a prescribed constant ratio of the actual velocity of the air stream at said region in the compressor to the rotational speed of the compressor rotor.

5. A propulsion system according to claim 4 in combination with adjusting means on said anemometer for varying and determining the value of said prescribed constant ratio.

6. A propulsion system for aircraft comprising a multi-stage axial-flow compressor, a bladed stator and a bladed rotor in said compressor, a gas-turbine in variable-speed driving relationship with said rotor, a combustion system connected to receive air from said compressor and to supply combustion products to said turbine as hot working fluid, means for supplying fuel to said combustion system and for varying the rate of supply, a jet pipe connected to receive exhaust gases from said turbine and discharge them rearwardly as a propulsive jet, and a yawmeter located in a position in the path of the stream of air through said compressor chosen where the velocity of air flow has a whirl velocity component and an axial component, proportionally responsive to the ratio of the said axial and whirl-velocity components, said means for varying the rate of fuel supply being connected to and actuated by said yawmeter to vary the supply of fuel to said combustion system in a sense tending to maintain a prescribed value of said ratio.

7. A propulsion system according to claim 6 in combination with adjusting means in said yawmeter for varying and determining said prescribed value of said ratio.

8. A propulsion system for aircraft comprising a multi-stage axial-flow compressor, a bladed stator and a bladed rotor in said compressor, a gas-turbine in driving relationship with said rotor, a combustion system connected to receive air from said compressor and to supply combustion products to said turbine as hot working fluid, means for supplying fuel to said combustion system, a jet pipe connected to receive exhaust gases from said turbine and discharge them rearwardly as a propulsive jet, a device for varying the supply of fuel to said combustion system, a variable area jet nozzle device on the rearward end of said jet pipe and means for operating at least one of said devices in accordance with the ratio of the actual velocity of flow of air through a chosen region of said compressor to the rotational speed of said compressor rotor and air together.

References Cited in the file of this patent

UNITED STATES PATENTS

| Number | Name | Date |
|---|---|---|
| 1,017,509 | Callan | Feb. 13, 1912 |
| 2,193,114 | Seipple | Mar. 12, 1940 |
| 2,280,835 | Lysholm | Apr. 28, 1942 |
| 2,295,728 | Gess | Sept. 15, 1942 |
| 2,306,953 | Jung | Dec. 29, 1942 |
| 2,382,707 | Gosslau et al. | Aug. 14, 1945 |
| 2,390,043 | Borden | Dec. 4, 1945 |
| 2,399,046 | Larrecq | Apr. 23, 1946 |
| 2,404,324 | Staley | July 16, 1946 |
| 2,423,183 | Forsyth | July 1, 1947 |
| 2,428,830 | Birmann | Oct. 14, 1947 |
| 2,455,292 | Borden | Nov. 30, 1948 |
| 2,559,623 | Holmes | July 10, 1951 |

FOREIGN PATENTS

| Number | Country | Date |
|---|---|---|
| 490,978 | Great Britain | Aug. 24, 1938 |